United States Patent
Gou et al.

(10) Patent No.: US 11,271,693 B2
(45) Date of Patent: Mar. 8, 2022

(54) TRANSMISSION BASED ON DATA BLOCKS

(71) Applicant: ZTE Corporation, Guangdong (CN)

(72) Inventors: Wei Gou, Guangdong (CN); Peng Hao, Guangdong (CN); Thorsten Schier, Stockholm (SE); Feng Bi, Guangdong (CN)

(73) Assignee: ZTE Corporation, Shenzhen (CN)

( * ) Notice: Subject to any disclaimer, the term of this patent is extended or adjusted under 35 U.S.C. 154(b) by 47 days.

(21) Appl. No.: 16/673,956

(22) Filed: Nov. 4, 2019

(65) Prior Publication Data

US 2020/0067667 A1 Feb. 27, 2020

Related U.S. Application Data

(63) Continuation of application No. PCT/CN2017/083343, filed on May 5, 2017.

(51) Int. Cl.
*H04L 5/00* (2006.01)
*H04L 5/22* (2006.01)

(52) U.S. Cl.
CPC .......... *H04L 5/0044* (2013.01); *H04L 5/0007* (2013.01); *H04L 5/0042* (2013.01); *H04L 5/22* (2013.01)

(58) Field of Classification Search
CPC ... H04L 1/0007; H04L 1/0045; H04L 1/0057; H04L 5/0007; H04L 5/0023; H04L 5/0042; H04L 5/0044; H04L 5/22
See application file for complete search history.

(56) References Cited

U.S. PATENT DOCUMENTS

| | | | | |
|---|---|---|---|---|
| 7,698,623 B2 * | 4/2010 | Hedberg | ............ | H03M 13/1102 714/790 |
| 7,987,410 B2 * | 7/2011 | Hedberg | ............ | H03M 13/1102 714/779 |

(Continued)

FOREIGN PATENT DOCUMENTS

| | | | | |
|---|---|---|---|---|
| AU | 2004302856 A1 * | 3/2005 | ......... | H04N 21/6112 |
| BR | 112018014387 A2 * | 12/2018 | ........ | H03M 13/2957 |

(Continued)

OTHER PUBLICATIONS

Interdigital Communications, Preemption/Superposition-based Multiplexing of eMBB and URLLC, Jan. 16, 2017, 3GPP TSG-RAN WG1 AH_NR Meeting, Tdoc: R1-1700721 (Year: 2017).*

(Continued)

*Primary Examiner* — Eric Nowlin
(74) *Attorney, Agent, or Firm* — Perkins Coie LLP

(57) ABSTRACT

Methods, systems, and devices are disclosed for implementing a transmission and feedback mechanism to enable the collaboration of different service types and efficient reporting of the transmission status. In one aspect, the disclosed technology can be implemented to provide a wireless communication method that includes receiving a message that includes a predetermined number of code block groups for a transmission; and dividing a plurality of data blocks in the transmission into a first part and a second part. The first part comprises a first number of code block groups and the second part comprises a second number of code block groups. The second number of code block groups is determined based on the predetermined number of code block groups in the control message.

16 Claims, 13 Drawing Sheets

(56) References Cited

U.S. PATENT DOCUMENTS

| | | | |
|---|---|---|---|
| 8,539,298 B2 * | 9/2013 | Shimanuki | H04L 1/0026 714/751 |
| 9,032,267 B2 * | 5/2015 | Shimanuki | H04L 1/1858 714/751 |
| 9,160,485 B2 * | 10/2015 | Kim | H04L 1/0061 |
| 9,338,691 B2 * | 5/2016 | Kim | H04B 7/0413 |
| 9,391,754 B2 * | 7/2016 | Nammi | H04B 7/0413 |
| 10,367,530 B2 * | 7/2019 | Sun | H03M 13/35 |
| 10,666,397 B2 * | 5/2020 | Wu | H04L 5/0053 |
| 10,708,099 B2 * | 7/2020 | Xu | H04L 5/0046 |
| 10,855,315 B2 * | 12/2020 | Sun | H03M 13/6513 |
| 10,892,860 B2 * | 1/2021 | Wang | H04L 1/1819 |
| 11,102,808 B2 * | 8/2021 | Takeda | H04W 74/08 |
| 2007/0022355 A1 * | 1/2007 | Golitschek Edler Von Elbwart | H03M 13/296 714/755 |
| 2007/0124643 A1 * | 5/2007 | Golitschek Edler Von Elbwart | H04L 1/0041 714/752 |
| 2010/0153815 A1 * | 6/2010 | Hedberg | H04L 1/005 714/752 |
| 2011/0004799 A1 * | 1/2011 | Shimanuki | H04L 1/0013 714/749 |
| 2012/0320852 A1 * | 12/2012 | Seo | H03M 13/6527 370/329 |
| 2013/0294357 A1 * | 11/2013 | Shimanuki | H04L 1/0013 370/329 |
| 2014/0153484 A1 * | 6/2014 | Kim | H04L 27/34 370/328 |
| 2016/0014637 A1 * | 1/2016 | Kim | H04B 7/0413 370/328 |
| 2016/0070615 A1 | 3/2016 | Zhong | |
| 2017/0026297 A1 * | 1/2017 | Sun | H04B 7/0623 |
| 2017/0126378 A1 * | 5/2017 | Luo | H04L 5/0048 |
| 2017/0207880 A1 * | 7/2017 | Sun | H03M 13/6513 |
| 2017/0222661 A1 * | 8/2017 | Sun | H04L 1/0041 |
| 2017/0230994 A1 * | 8/2017 | You | H04L 5/0053 |
| 2017/0289971 A1 * | 10/2017 | Wu | H04W 72/0453 |
| 2018/0123847 A1 * | 5/2018 | Xu | H04L 5/0046 |
| 2018/0278368 A1 * | 9/2018 | Kim | H04L 1/0058 |
| 2018/0279289 A1 * | 9/2018 | Islam | H04W 72/0446 |
| 2019/0059057 A1 * | 2/2019 | Peng | H04W 72/042 |
| 2019/0124682 A1 * | 4/2019 | Takeda | H04W 74/08 |
| 2019/0132087 A1 * | 5/2019 | Wu | H04L 5/0055 |
| 2019/0158249 A1 * | 5/2019 | Harada | H04L 1/1861 |
| 2019/0182827 A1 * | 6/2019 | Wang | H04W 72/0426 |
| 2019/0199469 A1 * | 6/2019 | Lin | H04L 1/0025 |
| 2019/0363833 A1 * | 11/2019 | Wang | H04L 1/189 |
| 2020/0067667 A1 * | 2/2020 | Gou | H04L 1/1812 |
| 2020/0100219 A1 * | 3/2020 | Takeda | H04L 5/0053 |
| 2020/0154309 A1 * | 5/2020 | Takeda | H04L 1/1614 |
| 2020/0235752 A1 * | 7/2020 | Sandberg | H03M 13/6522 |
| 2020/0295873 A1 * | 9/2020 | Jayasinghe | H04L 1/0061 |
| 2020/0374043 A1 * | 11/2020 | Lei | H04W 72/0413 |
| 2020/0404662 A1 * | 12/2020 | Zhang | H04L 25/03006 |

FOREIGN PATENT DOCUMENTS

| | | | | |
|---|---|---|---|---|
| CN | 101060481 A | | 10/2007 | |
| CN | 101667900 A | | 3/2010 | |
| CN | 101689974 A | * | 3/2010 | H04L 1/005 |
| CN | 101743711 A | | 6/2010 | |
| CN | 102752073 A | | 10/2012 | |
| CN | 102932101 A | * | 2/2013 | H04L 1/0026 |
| CN | 101689974 B | * | 4/2013 | H04L 1/1812 |
| CN | 103188050 A | * | 7/2013 | H04L 1/005 |
| CN | 103227702 A | | 7/2013 | |
| CN | 108604905 A | * | 9/2018 | H03M 13/255 |
| CN | 108886409 A | * | 11/2018 | H04W 72/042 |
| CN | 110326222 A | * | 10/2019 | H03M 13/09 |
| EP | 2166689 A1 | * | 3/2010 | H04L 1/1858 |
| EP | 2166689 A4 | * | 11/2013 | H04L 1/0003 |
| EP | 3403332 A1 | * | 11/2018 | H04L 1/1607 |
| EP | 3427416 A1 | * | 1/2019 | H04L 5/0053 |
| EP | 3427416 A4 | * | 7/2019 | H04L 27/2647 |
| EP | 3577768 A1 | * | 12/2019 | H03M 13/6393 |
| EP | 3577768 A4 | * | 11/2020 | H03M 13/6393 |
| JP | WO2009005047 A1 | * | 8/2010 | H04L 1/1671 |
| JP | 5229695 B2 | * | 7/2013 | H04L 1/1671 |
| JP | 5621871 B2 | * | 11/2014 | H04W 72/0466 |
| JP | 5929989 B2 | * | 6/2016 | H04L 1/1812 |
| KR | 20180103889 A | * | 9/2018 | H04L 1/08 |
| WO | WO-2009005047 A1 | * | 1/2009 | H04L 1/005 |
| WO | 2014/032294 A1 | | 3/2014 | |
| WO | 2016126653 A1 | | 8/2016 | |
| WO | WO-2017123345 A1 | * | 7/2017 | H04L 1/0057 |
| WO | WO-2017167310 A1 | * | 10/2017 | H04L 27/2647 |
| WO | WO-2018143890 A1 | * | 8/2018 | H03M 13/6306 |
| WO | WO-2019137204 A1 | * | 7/2019 | H04L 5/0094 |

OTHER PUBLICATIONS

Samsung, TB/CB Handling for eMBB, Jan. 16, 2017, 3GPP TSG RAN WG1 NR Ad-Hoc Meeting, Tdoc: R1-1700958 (Year: 2017).*

Samsung, Preemption-based multiplexing between eMBB and URLLC for DL, Jan. 16, 2017, 3GPP TSG RAN WG1 Meeting NR#1, Tdoc: R1-1700966 (Year: 2017).*

LG Electronics, Discussion on Multiplexing of eMBB and URLLC for Downlink, Feb. 13, 2017, 3GPP TSG RAN WG1 Meeting #88, Tdoc: R1-1702488 (Year: 2017).*

MediaTek Inc., URLLC and eMBB DL Multiplexing using CRC masking and multibit NACK feedback, Feb. 13, 2017, 3GPP TSG RAN WG1 Meeting #88, Tdoc: R1-1702745 (Year: 2017).*

Samsung, CB-group based retransmission for eMBB, Feb. 13, 2017, 3GPP TSG RAN WG1 Meeting #88, Tdoc: R1-1702990 (Year: 2017).*

Samsung et al., WF on CB or CB-group based retransmission, Feb. 13, 2017, 3GPP TSG RAN WG1 Meeting #88, Tdoc: R1-17xxxxx (Year: 2017).*

Mediatek, Inc., Considerations on CB Grouping for Multiple HARQ ACK/NACK Bits per TB, Apr. 3, 2017, 3GPP TSG RAN WG1 Meeting #88bis, Tdoc: R1-1704463 (Year: 2017).*

LG Electronics, Discussion on CB Group Based HARQ Operation, Apr. 3, 2017, 3GPP TSG RAN WG1 Meeting #88bis, Tdoc: R1-1704916 (Year: 2017).*

LG Electronics, Discussion on CB Group Based HARQ-ACK Feedback, Apr. 3, 2017, 3GPP TSG RAN WG1 Meeting #88bis, Tdoc: R1-1704918 (Year: 2017).*

Huawei et al., Discussion on CBG-based Feedback and Retransmission, Apr. 3, 2017, 3GPP TSG RAN WG1 Meeting #88bis, Tdoc: R1-1705066 (Year: 2017).*

Nokia et al., CBG Based Feedback for NR HARQ Operation, Apr. 3, 2017, 3GPP TSG RAN WG1 Meeting #88bis, Tdoc: R1-1705243 (Year: 2017).*

Samsung, Overview of CBG-Based Retransmission in NR, Apr. 3, 2017, 3GPP TSG RAN WG1 Meeting #88bis, Tdoc: R1-1705401 (Year: 2017).*

Lenovo et al., Discussion on Enhanced HARQ Feedback and CBG-Based Partial Retransmission, Apr. 3, 2017, 3GPP TSG RAN WG1 Meeting #88bis, Tdoc: R1-1705653 (Year: 2017).*

Coolpad, CB-Group Based HARQ-ACK Feedback and Retransmission, Apr. 3, 2017, 3GPP TSG RAN WG1 Meeting #88bis, Tdoc: R1-1705664 (Year: 2017).*

Samsung et al., WF on CB-Group Based Retransmission, Apr. 3, 2017, 3GPP TSG RAN WG1 Meeting #88bis, Tdoc: R1-1705585 (Year: 2017).*

Zte et al., WF on CBG Based Feedback, Subsequent (re)-Transmission and Preemption Indication, Apr. 3, 2017, 3GPP TSG RAN WG1 Meeting #88bis, Tdoc: R1-1705585 (Year: 2017).*

HTC, Discussion on CBG-Based HARQ Feedback, May 15, 2017, 3GPP TSG RAN WG1 Meeting #89, Tdoc: R1-1708876 (Year: 2017).*

Qualcomm Incorporated, CBG Construction Principles for CBG-Based Transmission with Multi-Bit HARQ Feedback, May 15, 2017, 3GPP TSG RAN WG1 Meeting #89, Tdoc: R1-1708882 (Year: 2017).*

(56) References Cited

OTHER PUBLICATIONS

CATR, Discussions on the Design on CBG, May 15, 2017, 3GPP TSG RAN WG1 Meeting #89, Tdoc: R1-1708952 (Year: 2017).*
Wilus Inc., Discussion on CBG Based Transmission for NR, May 15, 2017, 3GPP TSG RAN WG1 Meeting #89, Tdoc: R1-1708978 (Year: 2017).*
Ericsson, On Design of CBG HARQ-ACK Feedback Schemes, May 15, 2017, 3GPP TSG RAN WG1 Meeting #89, Tdoc: R1-1709107 (Year: 2017).*
Zte, Summary Email discussion on: "CBG based retransmission, Transmission/retransmission of preempted data before/after ACK NACK feedback, Preemption indication for NR", May 15, 2017, 3GPP TSG RAN WG1 Meeting #89, Tdoc: R1-1709148 (Year: 2017).*
Extended Search Report dated Apr. 2, 2020 for European Application No. 17908495.9, filed on May 5, 2017 (9 pages).
CATT, "Discussion on NR HARQ-ACK feedback mechanisms," 3GPP TSG RAN WG1 Meeting #88bis, Spokane, Washington, U.S.A., R1-1704583, 4 pages, Apr. 2017.
NTT Docomo, Inc., "Views on HARQ enhancements for NR," 3GPP TSG RAN WG1 Meeting #88, Athens, Greece, R1-1702815, 4 pages, Feb. 2017.
Office Action for Chinese Patent Application No. 201780092948.6, dated Aug. 4, 2020.
International Search Report and Written Opinion dated Jan. 26, 2018 for International Application No. PCT/CN2017/083343, filed on May 5, 2017 (7 pages).
Office Action for Chinese Patent Application No. 201780092948.6, dated Feb. 19, 2021.
Office Action for Chinese Patent Application No. 201780092948.6, dated Jun. 21, 2021.
Office Action for European Patent Application No. 17908495.9, dated Jul. 27, 2021.

\* cited by examiner

TRANSMISSION BASED ON DATA BLOCKS

CROSS REFERENCE TO RELATED APPLICATIONS

This patent document is a continuation of and claims the benefit of priority to International Patent Application No. PCT/CN2017/083343, filed on May 5, 2017. The entire content of the before-mentioned patent application is incorporated by reference as part of the disclosure of this application.

TECHNICAL FIELD

This patent document is directed generally to wireless communications.

BACKGROUND

The mobile communication technologies are moving the world toward an increasingly connected and networked society. In comparison with the existing wireless networks, the next generation systems and wireless communication techniques will need to support a much wider range of use-case characteristics and provide a much more complex range of access requirements and flexibilities.

SUMMARY

This patent document relates to techniques, systems, and devices for data transmission, and in particular, data transmission for preempted data or data that needs retransmission, including a transmission and feedback mechanism to enable the collaboration of different service types and efficient reporting of the transmission status.

In one aspect, the disclosed technology can be implemented to provide a wireless communication method that includes receiving a message that includes a predetermined number of code block groups for a transmission; and dividing a plurality of data blocks in the transmission into a first part and a second part. The first part comprises a first number of code block groups and the second part comprises a second number of code block groups. The second number of code block groups is determined based on the predetermined number of code block groups in the control message.

In another aspect, the disclosed technology can be implemented to provide a wireless communication method which includes transmitting a message including a predetermined number of code block groups for a transmission; and performing the transmission based on the control message, wherein the transmission includes a plurality of data blocks divided into a first part and a second part, the first part comprising a plurality of code block groups.

In another aspect, the disclosed technology can be implemented to provide a wireless communication method that includes transmitting a control message indicative of a plurality of data blocks for a transmission, wherein the plurality of data blocks are divided into a plurality of parts and the plurality of parts are time-division multiplexed according time-domain symbols in a scheduling unit; and performing the transmission of the plurality of data blocks according to the control message.

In another aspect, the disclosed technology can be implemented to provide a wireless communication method that includes receiving a control message indicative of a plurality of data blocks for a transmission, wherein the plurality of data blocks are divided into a plurality of parts and the plurality of parts are time-division multiplexed according time-domain symbols in a scheduling unit; and performing the transmission of the plurality of data blocks according to the control message.

In another aspect, the disclosed technology can be implemented to provide a wireless communication device. The device includes a memory to store code and a processor that is in communication with the memory and operable to execute the code to cause the wireless communication device to receive a message that includes a predetermined number of code block groups for a transmission, and divide a plurality of data blocks in the transmission into a first part and a second part. The first part comprises a first number of code block groups and the second part comprises a second number of code block groups. The second number of code block groups is determined based on the predetermined number of code block groups in the control message.

In another aspect, the disclosed technology can be implemented to provide a wireless communication device. The device includes a memory to store code and a processor that is in communication with the memory and operable to execute the code to cause the wireless communication device to transmit a message including a predetermined number of code block groups for a transmission; and perform the transmission based on the control message, wherein the transmission includes a plurality of data blocks divided into a first part and a second part, the first part comprising a plurality of code block groups.

In another aspect, the disclosed technology can be implemented to provide a wireless communication device. The device includes a memory to store code and a processor that is in communication with the memory and operable to execute the code to cause the wireless communication device to transmit a control message indicative of a plurality of data blocks for a transmission, wherein the plurality of data blocks are divided into a plurality of parts and the plurality of parts are time-division multiplexed according time-domain symbols in a scheduling unit; and perform the transmission of the plurality of data blocks according to the control message.

In another aspect, the disclosed technology can be implemented to provide a wireless communication device. The device includes a memory to store code and a processor that is in communication with the memory and operable to execute the code to cause the wireless communication device to receive a control message indicative of a plurality of data blocks for a transmission, wherein the plurality of data blocks are divided into a plurality of parts and the plurality of parts are time-division multiplexed according time-domain symbols in a scheduling unit; and perform the transmission of the plurality of data blocks according to the control message.

In another aspect, the disclosed technology can be implemented to provide a computer program product including a computer readable storage medium on which computer-executable instructions are stored. The instructions include instructions for receiving a message that includes a predetermined number of code block groups for a transmission; and instructions for dividing a plurality of data blocks in the transmission into a first part and a second part. The first part includes a first number of code block groups and the second part includes a second number of code block groups. The second number of code block groups is determined based on the predetermined number of code block groups in the control message.

In another aspect, the disclosed technology can be implemented to provide a computer program product including a computer readable storage medium on which computer-executable instructions are stored. The instructions include instructions for transmitting a message including a predetermined number of code block groups for a transmission; and instructions for performing the transmission based on the control message. The transmission includes a plurality of data blocks divided into a first part and a second part, and the first part includes a plurality of code block groups.

In another aspect, the disclosed technology can be implemented to provide a computer program product including a computer readable storage medium on which computer-executable instructions are stored. The instructions include instructions for transmitting a control message indicative of a plurality of data blocks for a transmission, wherein the plurality of data blocks are divided into a plurality of parts and the plurality of parts are time-division multiplexed according time-domain symbols in a scheduling unit; and instructions for performing the transmission of the plurality of data blocks according to the control message.

In yet another aspect, the disclosed technology can be implemented to provide a computer program product including a computer readable storage medium on which computer-executable instructions are stored. The instructions include instructions for receiving a control message indicative of a plurality of data blocks for a transmission, wherein the plurality of data blocks are divided into a plurality of parts and the plurality of parts are time-division multiplexed according time-domain symbols in a scheduling unit; and instructions for performing the transmission of the plurality of data blocks according to the control message.

The above and other aspects and their implementations are described in greater detail in the drawings, the description and the claims.

DETAILED DESCRIPTION

Figure 1A:
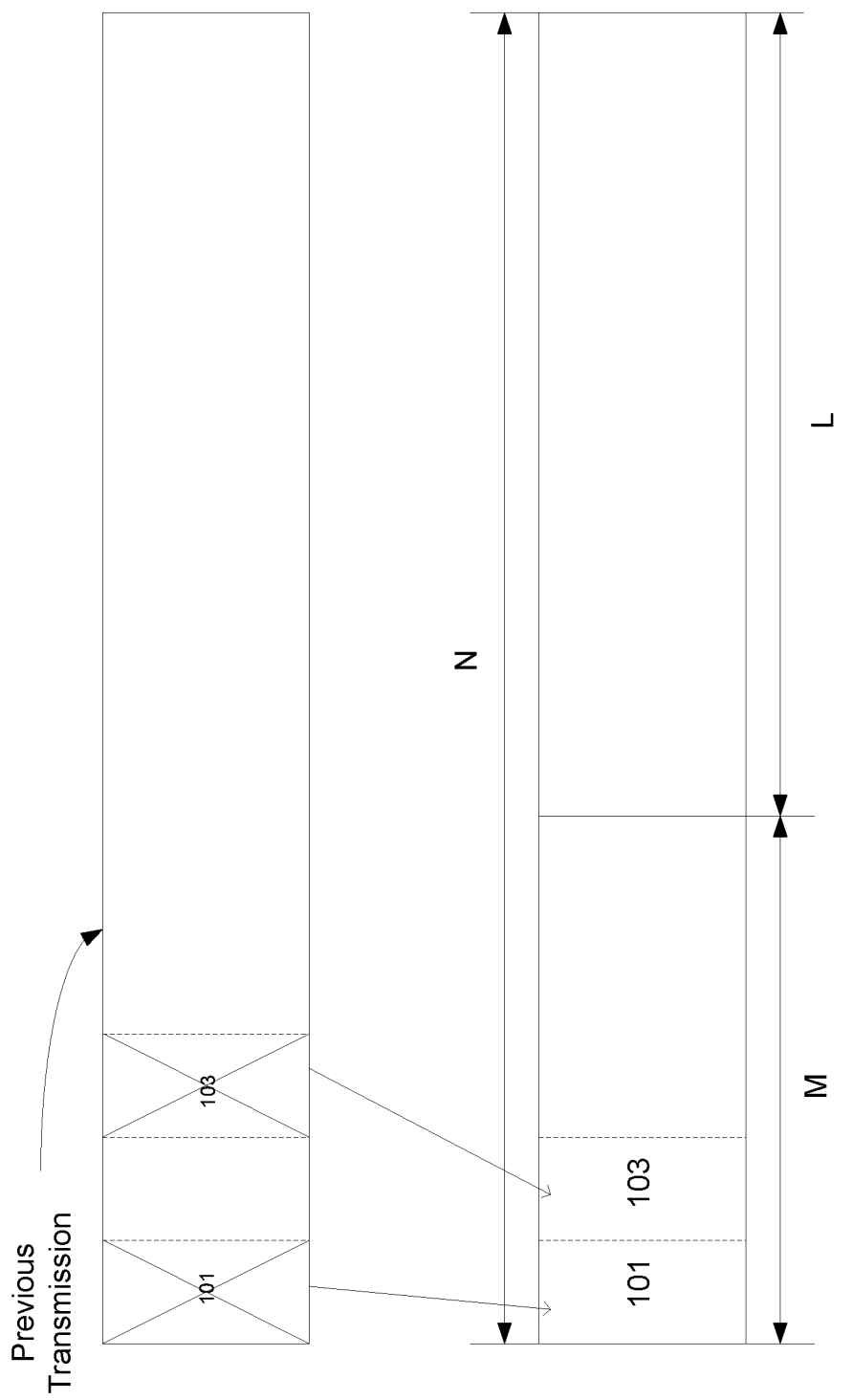
FIG. 1A shows a schematic diagram of an exemplary grouping of data blocks in a transmission.

The rapid growth of mobile communications and advances in technology demand for greater capacity and higher data rates. For example, currently, the next generation 5G New Radio (NR) wireless systems adopt at least three types of services: enhanced Mobile Broad Band (eMBB), Ultra-Reliable and Low Latency Communications (URLLC), and mass Machine Type Communications (mMTC). These services have different requirements for latency, coverage, and reliability. eMBB requires high transmission rate, in particular, high peak transmission rate, while being capable of operating with moderate latency and reliability. URLLC, on the other hand, requires low latency and high reliability for its transmission. mMTC places emphasis on the connection density and good transmission coverage enabled by a large number of terminals, and does not have strict requirements on latency or transmission rate.

Traditional technologies are falling short of meeting an increased demand of greater capacity and higher data rates. In addition, to increase transmission efficiency between the wireless nodes, it is desirable to allow a receiving device to decode OFDM symbols as being received by the receiving device. For example, the receiving device decodes the received OFDM symbol "on-the-fly," and, after a transmission of the last OFDM symbol data completes, the receiving device quickly acknowledges the receipt of the data to the transmitting device without further delay.

It is thus desirable to provide a transmission and feedback mechanism to enable the collaboration of different service types and efficient reporting of the transmission status. This desired feature, however, is not implemented in some existing wireless systems where a receiving device sends one acknowledgement for an entire transport block (TB) to a transmitting device and the corresponding transmitting device, therefore, is unable to determine, from the acknowledgement for the entire TB, which parts of the TB contains error and needs retransmission. Accordingly, in such existing systems, if a transmission error occurs for a small subsection of the TB, the entire TB must be retransmitted, leading to lower transmission efficiency. The disclosed technology can be implemented to solve this problem by providing a transmission and feedback mechanism based on smaller transmission units, such as code block groups (CBGs) or code blocks (CBs). The disclosed technology also allows an efficient transmission of preempted data when a transmission involves multiple services with different latency requirements.

Various example embodiments are disclosed herein to describe different aspects of the disclosed technology.

Example Embodiment 1

This embodiment provides one implementation of the transmission and feedback mechanism based on a plurality of data blocks (e.g. code block groups) in a transmission.

In a data transmission, parts of the data may fail to transmit successfully due to one or more factors, such as network congestion, signal interference, or other factors. Sometimes, parts of the data fail to transmit because one service (e.g., eMBB) is preempted by another service (e.g., URLLC) for particular latency requirements. When such a failure happens, a receiving device can notify the corresponding transmitting device which parts of the data need to be retransmitted. Upon receiving this notice from the receiving device, the transmitting device can send both retransmitted data and newly transmitted data in a subsequent transmission using one or more data blocks.

The one or more data blocks for a transmission can be one or more transport blocks (TBs) or one or more code blocks (CBs). The one or more data blocks can also be in the form of code data blocks (CBGs). For example, the CBGs for a current transmission can include code blocks of the retransmitted data grouped in a first number of CBGs and code blocks of the newly transmitted data grouped in a second number of CBGs. The receiving device identifies the code blocks (and corresponding CBGs) of the retransmitted data using information from the previous transmission. In some embodiments, the order of the code blocks (and corresponding CBGs) of the retransmitted data remains the same as in the previous transmission. The receiver further identifies the code blocks (and corresponding CBGs) of the newly transmitted data in a number of different ways that are consistent with the technology disclosed herein.

In some embodiments, a CBG can include a single CB. Therefore, it is notable that all descriptions and methods applicable to CBG can also be applied to code blocks. It is also notable that the retransmitted data described in this patent document includes data to be transmitted again due to network failure and data to be transmitted due to preemption by another service in a previous transmission.

To facilitate a more efficient transmission of the data blocks, the transmitting device and the receiving device can operate upon a predetermined, known number of CBGs to be used in the current data transmission. For example, the transmitting device (e.g. a base station gNB) can send a control message, such as a DCI message, to the receiving device (e.g. a user entity UE) to indicate the predetermined number of CBGs to be used. In the case of uplink transmission, the receiving device (e.g. a base station gNB) can send such control message to the transmitting device (e.g. a user entity UE). In some embodiments, the predetermined number of CBGs is the total number of CBGs expected in the current transmission. For example, as depicted in FIG. 1A, the transmitting device transmits a total number of N code block groups (CBGs) for the current transmission. The receiving device first determines the number of CBGs corresponding to the retransmitted data, e.g., M, based on the previous transmission. Because the receiving device is aware that CBG 101 and CBG 103 fail to transmit successfully in a previous transmission, the receiving device recognizes the CBGs belong to the retransmitted data in the current transmission. The receiving device then determines the number of CBGs corresponding to the newly transmitted data (e.g., L) based on the total expected number of CBGs (e.g., N) in the transmission. In this particular example, L=N−M. The receiving node then sends acknowledgement to the transmitting device to indicate that a total number of N code block groups has been received at the receiving end. The acknowledgment can be an ACK to indicate that the transmission is successful, or an NACK to indicate that the transmission encounters errors.

Figure 1B:
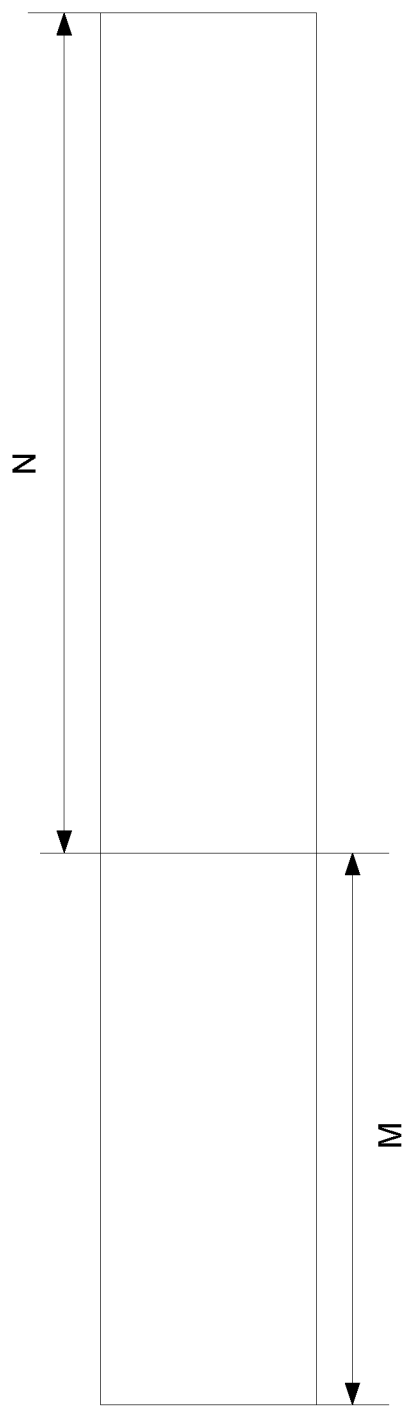
FIG. 1B shows a schematic diagram of another exemplary grouping of data blocks in a transmission.

In some embodiments, the predetermined number of CBGs is the number of CBGs for newly transmitted data. For example, as shown in FIG. 1B, the receiving device first determines the number of CBGs corresponding to the retransmitted data (e.g., M) based on the previous transmission. The receiving device then recognizes that the number of CBGs of the newly transmitted data has been configured to N. In this particular example, the receiving node determines that the total number of CBGs in the current transmission is M+N, and sends acknowledgement to the transmitting device to indicate that a total number of M+N code block groups has been received in the current transmission.

The receiving device can send acknowledgement of the current transmission in accordance to its determination of the CBGs used in one or two parts of the transmission. In some embodiments, the receiving device can encode the acknowledgement for the retransmitted data together with the acknowledgement for the newly transmitted data. For example, when the transmitting device and the receiving device agree upon a total number of N code block groups for a transmission, the transmitting device expects an acknowledgement indicating transmission of N code block groups. Therefore, the receiving node can encode the acknowledgement of the retransmitted data and the newly transmitted data together (e.g. N code block groups in total) to facilitate the understanding of the sending node. Alternatively, when the transmitting device and the receiving device agree upon a number of N code block groups for newly transmitted data, the transmitting device may expect one or more acknowledgements indicating transmission of a changing number of CBGs. In those types of scenarios, the receiving node can encode the acknowledgement for the retransmitted data and the acknowledgement for the newly transmitted data independently. Similarly, transmission of the acknowledgment(s) can be performed together or independently depending on the agreement between the transmitting device and the receiving device.

After the receiving device determines the total number of CBGs that it needs to acknowledge to the transmitting device, the receiving device proceeds to group the code blocks into a number of CBGs. For example, the receiving device can keep the retransmitted data same as previous transmission. Specifically, the number of code blocks for the retransmitted data is the same as the number of code blocks that are preempted or fail to transmit successfully in the previous transmission. The relative order of the code blocks also remains the same. The receiving device may further determine that the grouping of the code blocks into the code block groups is the same as the previous transmission.

Figure 2A:
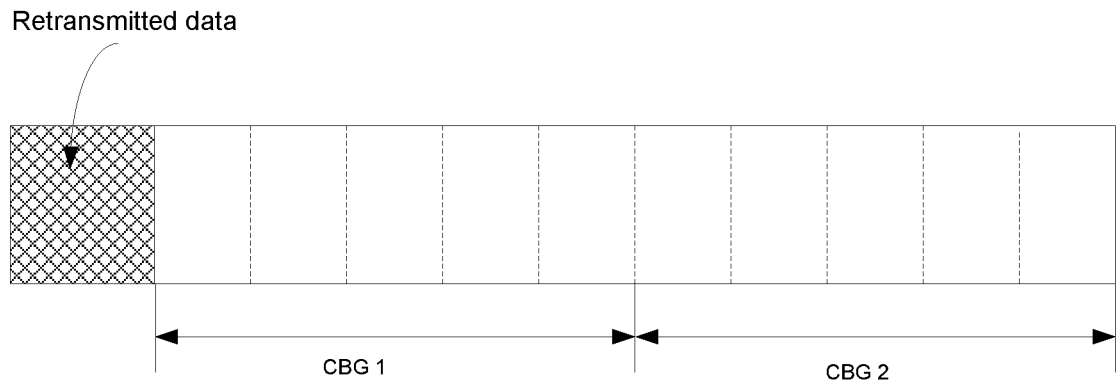
FIG. 2A shows an exemplary diagram for identifying code data groups for the newly transmitted data.
Figure 2B:
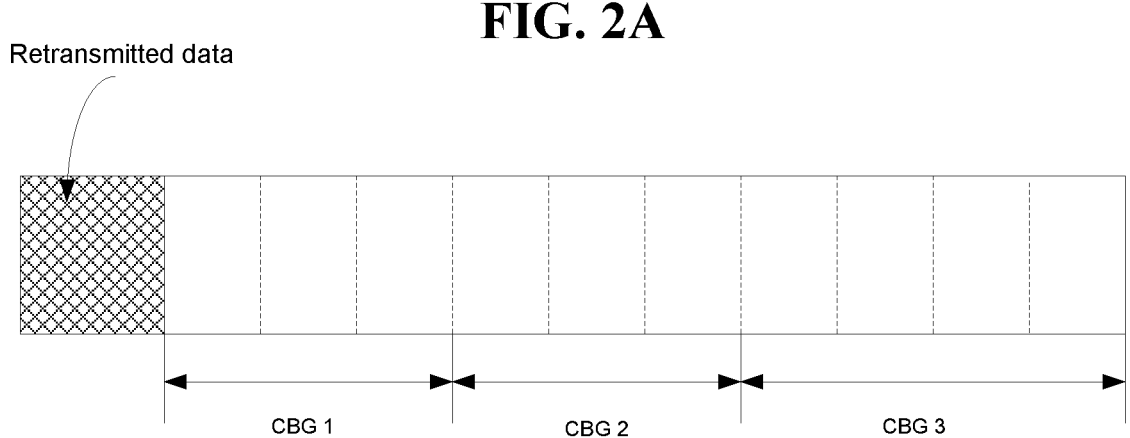
FIG. 2B shows another exemplary diagram for identifying code data groups for the newly transmitted data.
Figure 2C:
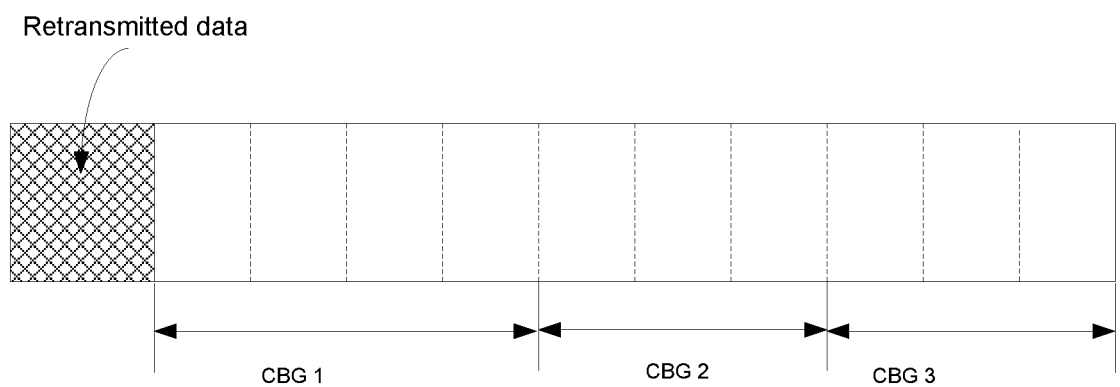
FIG. 2C shows yet another exemplary diagram for identifying code data groups for the newly transmitted data.

After identifying the retransmitted data, the receiving device can group the newly transmitted data so that CGBs for the newly transmitted data have equal number of code blocks. In some embodiments, the receiving device may not receive any retransmitted data. The receiving device can proceed directly to group the newly transmitted data using methods in accordance with the disclosed technology. For example, as shown in FIG. 2A, the receiving device receives ten code blocks for newly transmitted data and it determines that they should be grouped into two CBGs. It then groups the newly transmitted data to two CBGs, each containing five code blocks. In some cases, the first CBG or the last CBG may have unequal amount of code blocks as compared to the remaining of the CBGs, but the grouping is still substantially equal among all the CBGs. For example, as shown in FIG. 2B, the receiving device accepts ten code blocks for newly transmitted data and determines how the accepted tend code blocks should be partitioned into three CBGs. For example, the receiving device may subsequently create a first CBG having three code blocks, a second CBG having three code blocks, and a third CBG having four blocks. Alternatively, such as shown in FIG. 2C, the receiving device may create a first CBG having three code blocks, a second CBG having three code blocks, and a third CBG having four blocks.

Figure 2D:
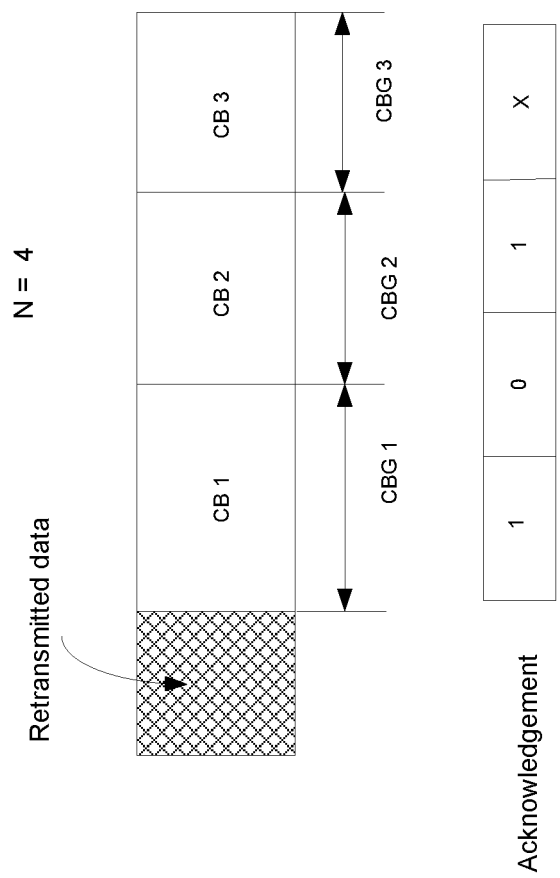
FIG. 2D shows an example of acknowledging a small number of code blocks of newly transmitted data.

In some embodiments, the receiving device recognizes that the number of CBGs for the newly transmitted data is configured to N, yet only M (M<N) number of code blocks of data are transmitted as newly transmitted data. For example, as shown in FIG. 2D, the transmitting device and the receiving device have agreed that the number of CBGs for newly transmitted data is N=4. In a subsequent transmission, however, the receiving device only receives M=3 code blocks of data. It proceeds to group the newly transmitted data into three CBGs, each code block as a CBG. In its acknowledgement, e.g., bitmap message including one bit for each CBG, the receiving device sends valid bits (e.g., 1 as ACK and 0 as NACK) for the M=3 CBGs, and an invalid bit for the missing fourth CBG. On the transmitting side, when the transmitting device receives the acknowledgement from the receiving device, it recognizes that only three bits in the acknowledgement are valid and the last bit contains invalid information.

In some embodiments, the receiving device receives one transport block of data for a transmission. The transport block can include only newly transmitted data, or only retransmitted data, or a combination of both. The received transport block includes M=3 code blocks. The receiving device recognizes that the number of CBGs for this transmission is configured to N=4. The receiving device proceeds to group the data in the transmission into three CBGs, each code block as a CBG. In its acknowledgement, e.g., bitmap message including one bit for each CBG, the receiving device sends valid bits (e.g., 1 as ACK and 0 as NACK) for the M=3 CBGs, and an invalid bit for the missing fourth CBG. On the transmitting side, when the transmitting device receives the acknowledgement from the receiving device, it recognizes that only three bits in the acknowledgement are valid and the last bit contains invalid information.

Example Embodiment 2

This embodiment describes an example for transmitting the retransmitted data and the newly transmitted data. In this embodiment, the retransmitted data and the newly transmitted data can be regarded as one transport block (TB).

Based on a previous transmission, the receiving device can determine which CBGs need to be retransmitted and inform the transmitting device via acknowledgement(s). If the transmitting device correctly receives the acknowledgement(s) from the receiving device, it can perform retransmission in a current transmission based on such information.

Figure 3A:
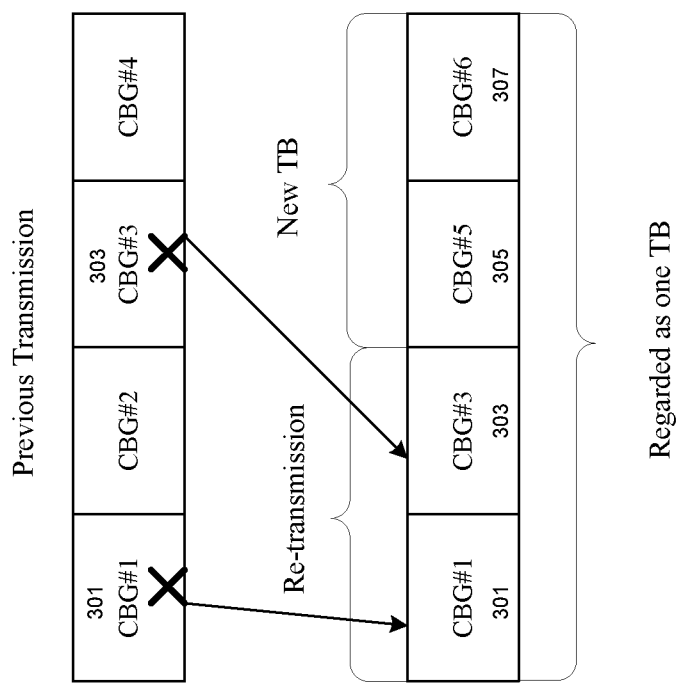
FIG. 3A shows an example of transmitting the retransmitted data and the newly transmitted data in one transport block.
Figure 3B:
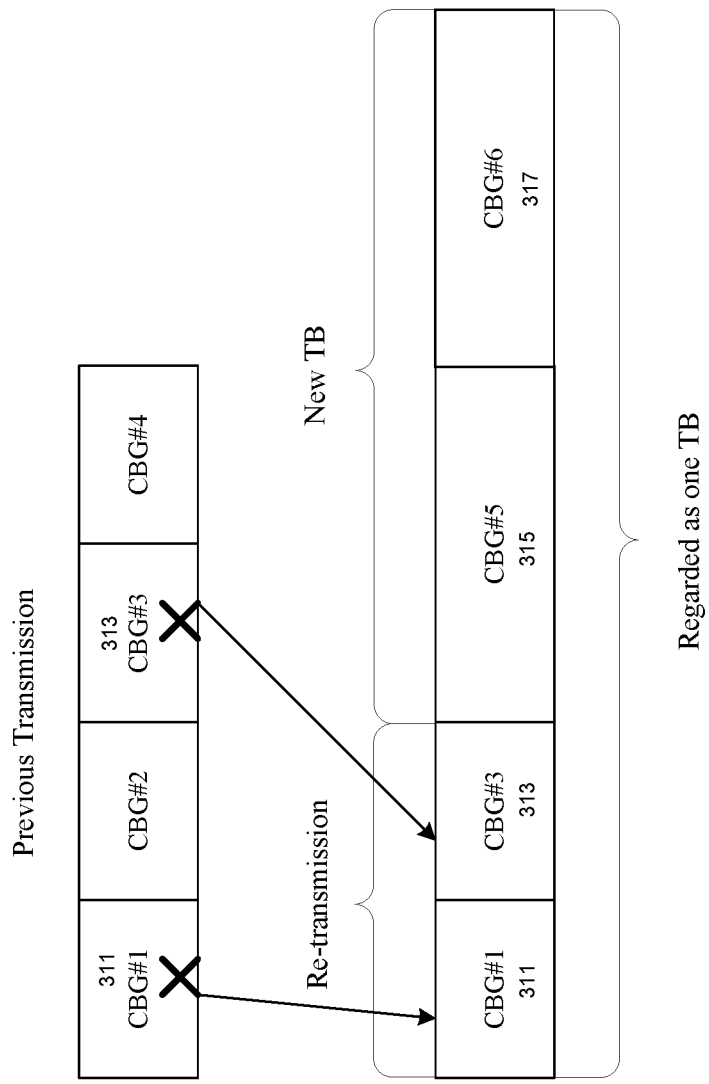
FIG. 3B shows another example of transmitting the retransmitted data and the newly transmitted data in one transport block.

FIGS. 3A-B show examples of transmitting the retransmitted data and the newly transmitted data. In these examples, the retransmitted data and the newly transmitted data in the current transmission can be regarded as one transport block. For the current transmission, the transmitting device can keep the retransmitted data the same as previous transmission. Specifically, the number of code blocks for the retransmitted data (301 and 303) is the same as the number of code blocks that fail to transmit successfully in a previous transmission. The relative order of the code blocks (301 and 303) remains the same. In some embodiments, the transmitting device can use same or different modulation and coding information, and/or resource allocation information for the retransmitted data. The transmitting device can also determine a position indicating the start of the retransmitted data. For example, the transmitting device can, by default, place the retransmitted data at the beginning of the current transmission. Alternatively, the transmitting device may also place the retransmitted at the end of the current transmission. In some implementations, the transmitting device can map the modulated data symbols to the allocated resources according to the predefined mapping rules. The transmitting device can also attach an error-detecting code, such as CRC, as if the retransmitted data and the newly transmitted data are regarded as one transport block.

The receiving device can use the beginning of the current transmission as the default start position for the retransmitted data. The receiving device may also use information from one or more control message(s) to identify the beginning of the retransmitted data. The receiving device can identify the start position for the newly transmitted data accordingly and can then proceed to group the code blocks for the newly transmitted data based on the number of CBGs for the new data. In some embodiments, as shown in FIG. 3A, the receiving device groups the data so that the size of CBGs for the newly transmitted data (305 and 307) is the same as the size of CBGs for the retransmitted data (301 and 303). Sometimes, as shown in FIG. 2B, the receiving device may use a different CBG size for the newly transmitted data (315 and 317) as compared to the CBG size used for the retransmitted data (311 and 313).

Alternatively, the transport block including both the retransmitted data and new data can be scheduled for transmission through a control message, e.g., a DCI message, prior to the start of the transmission. For example, the transmitting device can allocate resources required for the transmission in a DCI message without distinguishing between the resources needed for retransmitted data and the resources needed for new data. The DCI message can also contain modulation and coding information, which can be independent for each data block or shared by at least a subset of the data blocks. In some implementations, the transmitting device has the autonomy to determine new data size in a transmission according to the demand. Therefore, the size of the newly transmitted data in the current transmission can be the same or different from the size of newly transmitted data in previous transmissions.

Based on the information included in the DCI message, the receiving device can compute the number of CBGs (or CBs) for the retransmitted data, thereby decoding the retransmitted CBGs (CBs). The receiving device may also know the corresponding CBGs (or CBs) for the newly transmitted data from the DCI message. Details regarding the control message will be further discussed in example embodiment 10.

Example Embodiment 3

This embodiment describes an example for transmitting the retransmitted data and the newly transmitted data. In this embodiment, the retransmitted data and the newly transmitted data can be regarded as two transport blocks (TBs). In some implementations, the retransmitted data includes a plurality of CBGs. In some cases, the retransmitted data includes a transport block (TB). The newly transmitted data can also include a transport block.

For example, the retransmitted data in the current transmission can be regarded as a first transport block (TB), and the newly transmitted data can be regarded as a second transport block (TB). The two transport blocks can be scheduled for transmission through a control message, e.g., a DCI message, prior to the start of the transmission. Details regarding the control message will be further discussed in example embodiment 10. In some embodiments, the control message does not need to indicate the specific resources used by each transport block, thereby reducing signaling overhead.

In some embodiments, the transmitting device computes a first error-detecting code for the retransmitted data. The first error-detecting code is computed based on CBGs of the retransmitted data in its original order. When the receiving device receives and decodes the data, it can perform an integrity check for the retransmitted data to determine whether retransmission is successful.

The transmitting device can also compute a second error-detecting code for the newly transmitted data. The receiving device can perform an integrity check for the newly transmitted data independently to determine whether the new transmission is successful.

Example Embodiment 4

This embodiment describes an example for transmitting the retransmitted data and the newly transmitted data. In this embodiment, the retransmitted data and the newly transmitted data can be regarded as two transport blocks (TBs). In some implementations, the retransmitted data includes a plurality of CBGs. In some cases, the retransmitted data includes a transport block (TB). The newly transmitted data can also include a transport block.

In this example, the retransmitted data in the current transmission can be regarded as a first transport block (TB), and the newly transmitted data can be regarded as a second transport block (TB). The two transport blocks can be scheduled for transmission through a control message, e.g., a DCI message, prior to the start of the transmission. Details regarding the control message will be further discussed in example embodiment 10. In some embodiments, the control message does not need to indicate the specific resources used by each transport block, thereby reducing signaling overhead.

In some embodiments, the transmitting device computes a first error-detecting code for the retransmitted data. The first error-detecting code is computed based on the code blocks of the retransmitted data. For example, the code blocks for the retransmitted data are concatenated in accordance with the original order in the previous transmission and the CRC is calculated accordingly.

Example Embodiment 5

This embodiment describes an example for transmitting the retransmitted data and the newly transmitted data. In this embodiment, the retransmitted data and the newly transmitted data can be regarded as two transport blocks (TBs). In some implementations, the retransmitted data includes a plurality of CBGs. In some cases, the retransmitted data includes a transport block (TB). The newly transmitted data can also include a transport block.

In this example, the retransmitted data in the current transmission can be regarded as a first transport block (TB), and the newly transmitted data can be regarded as a second transport block (TB). The two transport blocks can be scheduled for transmission through a control message, e.g., a DCI message, prior to the start of the transmission. Details regarding the control message will be further discussed in example embodiment 10. In some embodiments, the control message does not need to indicate the specific resources used by each transport block, thereby reducing signaling overhead.

In some embodiments, the transmitting device can add an error-detecting code to each CBG of the retransmitted data. The receiving device performs an error check for each CBG of the retransmitted data based on the corresponding CRC value to determine whether the retransmission is successful.

Example Embodiment 6

This embodiment describes an example for transmitting the retransmitted data and the newly transmitted data. In this embodiment, the retransmitted data and the newly transmitted data can be regarded as two transport blocks (TBs). In some implementations, the retransmitted data includes a plurality of CBGs. In some cases, the retransmitted data includes a transport block (TB). The newly transmitted data can also include a transport block.

In this example, the retransmitted data in the current transmission can be regarded as a first transport block (TB), and the newly transmitted data can be regarded as a second transport block (TB). The two transport blocks can be scheduled for transmission through a control message, e.g., a DCI message, prior to the start of the transmission. Details regarding the control message will be further discussed in example embodiment 10. In some embodiments, the control message does not need to indicate the specific resources used by each transport block, thereby reducing signaling overhead.

In some embodiments, for those CBs that are retransmitted in this transmission, the CRC is concatenated at the bit level according to the original order of the CB. After receiving the CBs that are retransmitted, the receiving device can perform CRC check on the bits at the bit level to determine whether the CB bits are successfully decoded.

Example Embodiment 7

This embodiment describes an example for transmitting the retransmitted data and the newly transmitted data. In this embodiment, the retransmitted data and the newly transmitted data can be regarded as one transport block (TB).

In this example, the retransmitted data and the newly transmitted data in the current transmission can be regarded as one transport block (TB). The transport block can be scheduled for transmission through a control message, e.g., a DCI message, prior to the start of the transmission. Details regarding the control message will be further discussed in example embodiment 10.

In some embodiments, the transmitting device can attach an error-detecting code to the entire transport block based on the CBGs included in the retransmitted data and the newly transmitted data. In some embodiments, the transmitting device can attach an error-detecting code to the entire transport block based on the code blocks included in the retransmitted data and the newly transmitted data.

Alternatively, the transmitting device can compute a first error-detecting code to the code block groups or code blocks of the retransmitted data. The transmitting device then computes a second error-detecting code for the entire transport block. The receiving device can perform corresponding integrity checks using both the first and second error-detecting codes to determine whether the retransmission and the new transmission are successful.

Example Embodiment 8

This example describes an example of an alignment of the code block groups and the number of time-domain symbols used in a transmission.

When the transmitting device transmits a transport block, the size of the transport block is determined by various factors, such as modulation and coding mode, resource allocation, and number of CBs in each CBG. In some embodiments, each CBG can include an integer number of symbols in the time-domain so that, when retransmission is performed based on CBGs, there is no waste of resources in the retransmission.

The transmitting device can perform this type of alignment for both downstream and/or upstream data transmission. Each CBG of the downstream or upstream data corresponds to an integer number of OFDM symbols within the allocated resource range. In a way, it can also be understood as an OFDM symbol in the allocated frequency domain containing data from a single CBG.

Example Embodiment 9

This example describes an example for using an aligned CBG in data puncture scenarios.

Figure 4:
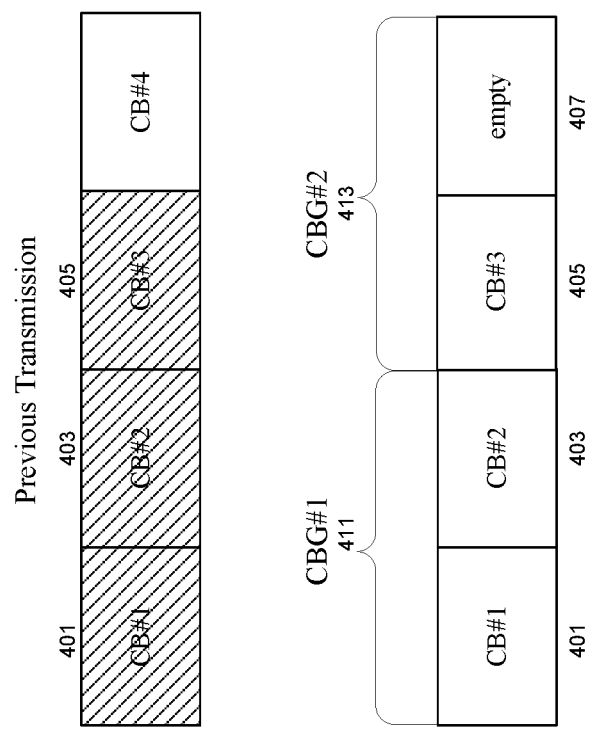
FIG. 4 shows an exemplary scenario of unaligned punctured transmission.

When a transmitting device transmits data for service A (such as eMBB service) and service B (such as URLLC service), service B may puncture data for service A because service B has a low latency requirement. FIG. 4 shows an exemplary scenario of unaligned punctured data transmission. In this example, each CBG includes two code blocks and the transmission is performed based on CBGs. The punctured data in a previous transmission contains CB #1 (401), CB #2 (403), and CB #3 (405). In the current transmission, all the punctured data needs to be transmitted. However, because the punctured data does not align to a single CBG, two CBGs (411 and 413) are required for the transmission and some resources (407) are wasted in the second CBG 413.

It is thus desirable to aligned the punctured data with boundaries of data blocks used in the current transmission. For example, when transmission is performed based on CBGs, it is desirable to puncture X number of symbols, where X can be grouped into an integer number of CBGs (e.g. Y CBGs). Then, during the transmission of the punctured data, a retransmission of the corresponding CBGs (e.g., Y CBGs) can include all X number of punctured symbols without introducing any waste of transmission resources.

In some embodiments, puncture can be performed based on CBGs. For example, when service A is punctured by service B, the puncture is performed in units of CBG. The starting OFDM symbol of the puncture is the first OFDM symbol of a CBG, and the punctured OFDM symbols align with an integer number of CBGs. This type of puncture scheme allows a transmission to avoid transmitting more CBGs than necessary for the punctured data.

The CBGs for the punctured data can be transmitted separately, or be combined with CBGs for newly transmitted data as described in previous embodiments. The transmission of the punctured data can also be managed using a control message, such as a DCI message. For example, the DCI message can indicate which parts of the data are punctured in a previous transmission so that the punctured data can be distinguished from retransmitted data. The receiving device then receives and decodes the punctured data accordingly.

Figure 5:
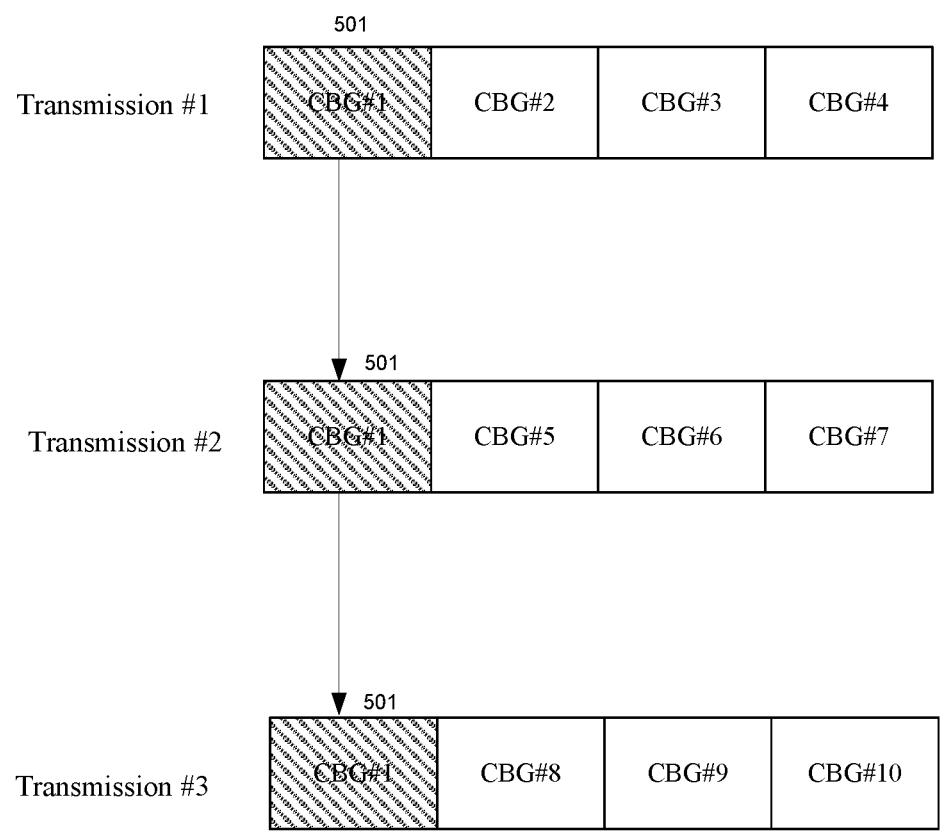
FIG. 5 shows an exemplary scenario when data puncture happens at the same location for multiple transmissions.
Figure 6:
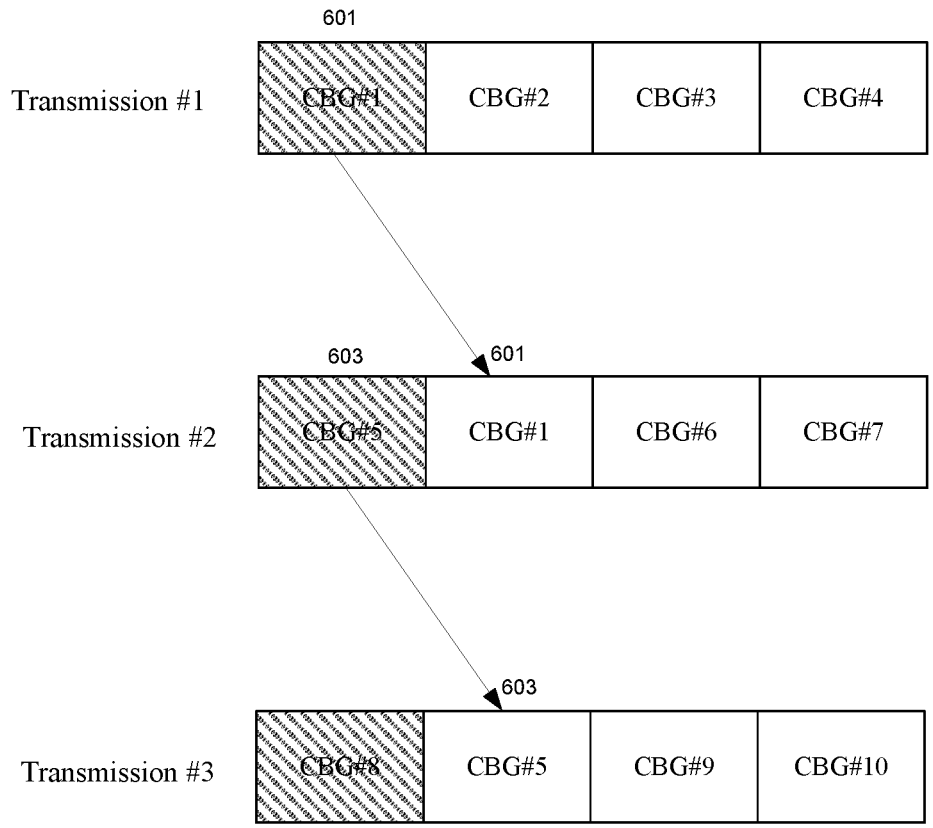
FIG. 6 shows an exemplary scenario when a DCI message is used to re-position the punctured data in transmissions.

The use of the DCI message also introduces flexibility in positioning the punctured data in a transmission. Sometimes, puncture can happen at the same position for multiple transmissions. FIG. 5 shows an exemplary scenario when data puncture happens at the same location for multiple transmissions. In this case, if the transmitting device relies on the default position (e.g., the beginning of the transmission) to place the punctured data, the same data CBG #1 (501) always gets punctured and cannot be transmitted successfully for at least a number of attempts. FIG. 6 shows an alternative scenario when a DCI message is used to re-position the punctured data in a transmission. In this particular embodiment, the punctured data CBG #1 (601) is positioned to a different location in the transport block of the second transmission. CBG #5 (603) is subsequently punctured, and is placed into a different location in the third transmission to ensure that its content can eventually be transmitted successfully.

The transmission location of the punctured data may be reserved in advance, or be determined at the time of transmission to allow adjustment based on the transmission status. In some embodiments, the transmission location of the punctured data remains semi-static and can be changed periodically to avoid recurrent transmission failures of the same data.

Example Embodiment 10

This example describes an example for using a control message to manage the transmission of data.

In this example, one or more control messages, e.g., DCI messages, can be used to aid the transmission of the plurality of data blocks in both uplink and downlink directions. For example, the transmitting device can allocate resources required for the data transmission in a DCI message without distinguishing between the resources needed for retransmitting data and the resources needed for new data transmission. The DCI message can also contain modulation and coding information, which can be independent for each data block or shared by at least a subset of the data blocks. In some implementations, the transmitting device has the autonomy to determine new data size in a transmission according to the demand. Therefore, the size of the newly transmitted data in the current transmission can be the same or different from the size of newly transmitted data in previous transmissions.

The receiving device can recognize which data blocks are for the retransmitted data based on the information included in the DCI messages, thereby decoding the retransmitted data accordingly. For example, a DCI message can include at least one of the following properties: the number of retransmitted code blocks (or CBGs), the relative position of the retransmitted data in code blocks (or CBGs), resource information, modulation and encoding information, and predefined modulation symbols mapping rules. The receiving device can first calculate the number of code blocks (or CBGs) for the retransmitted data and determine the amount of resources occupied by the retransmitted data. The receiving device can also determine the range of retransmitted data according to the resource allocation information, predefined mapping rules, and/or the relative position of the retransmitted data in code blocks (or CBGs).

In some embodiments, the transmitting device can schedules a transmission of multiple transport blocks by one DCI message. For example, the multiple transport blocks are time-division multiplexed according OFDM symbols in a scheduling unit. The multiple transport blocks can include newly transmitted data. The multiple transport blocks can also include retransmitted data that has been preempted or encounters transmission errors in a previous transmission. The DCI message can include the time-domain resource locations of the multiple transport blocks respectively. The transport blocks can also be configured to use the same or different physical resource block (PRB) and/or modulation and coding information.

For example, when the transmitting device uses a DCI message to schedule transmission of two TBs that are time-division multiplexed according OFDM symbols in a scheduling unit, the DCI message includes information about the schedules for each of the TB in the time domain and the specific OFDM symbol resource allocations. In some implementations, the two TBs belong to the same user entity (UE). In a particular example, the first TB starts from a first predetermined start position, or a start position indicated by the DCI message, and occupies a length of two OFDM symbols. The second TB starts from a second predetermined start position and occupies a length of two OFDM symbols. The two TBs can be adjacent to each other—that is, the second predetermined start position is the same as the end position of the first TB. In that case, the DCI message only includes a first start position for the first TB. For the remaining TBs, the DCI message includes an end position (or a length) for each of the TBs, leading to a smaller signaling overhead. In some embodiments, there could be gaps between the multiple TBs. The corresponding DCI message then includes, for each of the TB, a start position and an end position (or corresponding length).

In summary, a DCI that manages transmission for multiple data blocks (e.g., multiple CBs, multiple CBGs, or multiple TBs, or any combinations thereof) may contain one or more of the following information:

1) Time-domain information of the OFDM symbols for each of the data block. Multiple data blocks can share the same time-domain OFDM symbol information, reducing the signaling overhead of the DCI message.

2) Frequency-domain information regarding resource allocation by each data block. For example, the DCI message can include information of physical resource block (PRB) for each data block. The PRB can be shared by multiple data blocks to reduce signaling overhead. Each data block can also have independent PRB.

3) The modulation and coding information used by each data block. The modulation and coding information may be shared by multiple data blocks. It can also be configured separately for each block.

4) The respective process identifier of each data block. This information can also be shared or configured independently for each data block. To reduce system overhead, the retransmitted data can use the original process identifier for the initial transmission without being allocated new process identifiers. The newly transmitted data can be configured to use a new process identifier.

5) The subcarrier information used by each data block. This information may be shared by multiple data blocks or configured separately for each data block.

When both the time domain information and the frequency domain information are shared, it is desirable to have a pre-configured order of the data blocks. In some embodiments, based on knowledge of prior transmissions, the transmitting and receiving device can calculate the size of a data block even though the size is not defined in the DCI message.

The retransmissions mechanism described in the above embodiments can use such DCI messages to aid transmission. Instead of relying on default locations of the retransmitted data, the transmitting device can inform the receiving device the structure of the current transmission using the DCI message.

Example Embodiment 11

This example describes an example for using an aligned CBG in data puncture scenarios.

When a transmitting device transmits data for service A (such as eMBB service) and service B (such as URLLC service), service B may puncture data for service A because service B has a low latency requirement. In some embodiments, the receiving device is not aware that some data for service A has been punctured and replaced by data for service B. The receiving device continues to decode data as if all the data is for service A, which results in decoding failures for the punctured data. The receiving device then sends acknowledgement such as NACK for the punctured data. Sometimes, the receiving device may still send ACK after such failures. This can happen when there are other types of errors present in the transmission.

Because the transmitting device is aware that some data has been punctured in a previous transmission, the transmitting device should transmit the punctured data regardless of the type of acknowledgement (e.g., ACK or NACK) it receives from the receiving device.

Example Embodiment 12

This example describes an example for transmission of punctured data using mini-slots.

When a transmitting device transmits data for service A (such as eMBB service) and service B (such as URLLC service), service B may puncture data for service A because service B has a low latency requirement. The transmitting device then transmit the punctured data in a subsequent transmission.

In some embodiments, the punctured data can be transmitted based on mini-slots. A mini-slot contains its own independent DCI information, which forms a separate transmission unit. For example, the punctured eMBB data can be transmitted based on mini-slots, and the newly transmitted data for either eMBB or URLLC service can be transmitted based on code blocks or code block groups at the same time. In some implementation, a single DCI message can be used to manage the transmission of both.

Example Embodiment 13

This example describes an example for operating a transmitting device to control the timing of punctured data transmission to reduce network signaling overhead.

When a transmitting device transmits data for service A (such as eMBB service) and service B (such as URLLC service), service B may puncture data for service A because service B has a low latency requirement. The transmitting device needs to determine when it should transmit the punctured data to achieve good transmission efficiency.

For example, eMBB service has been punctured by URLLC service in scheduling unit n. Normally, the transmitting device receives acknowledgement regarding this transmission at scheduling unit n+4.

If the transmitting device transmits the punctured data prior to scheduling unit n+4, there is a likelihood that the receiving device receives and decodes the punctured data correctly prior to its acknowledgment of transmission n. The receiving device can choose to combine the acknowledgements and acknowledge that the punctured data has been transmitted successfully. In that case, the transmitting device receives only one set of acknowledgement to indicate that the punctured data has been transmitted successfully.

If the transmitting device transmits the punctured data after scheduling unit n+4, the acknowledgements it receives from the receiving device would indicate transmission failures for the punctured data. The transmitting device needs to wait for another set of acknowledgement to ascertain that the punctured data has been transmitted successfully.

It is, therefore, desirable for the transmitting device to know the capabilities of the receiving device. For example, if the receiving device is capable of decoding and acknowledging the transmission of data within a short period of time, the transmitting device may decide to transmit the punctured data right away (e.g., prior to scheduling unit n+4) in order to reduce signaling overhead on the network. However, if the receiving device is not capable of responding in time, the transmitting device may take other factors into consideration and postpone the transmission of the punctured data to a later time (e.g., after schedule unit n+4) because it is inevitable that the transmitting device would receive two sets of acknowledgement.

Figure 7:
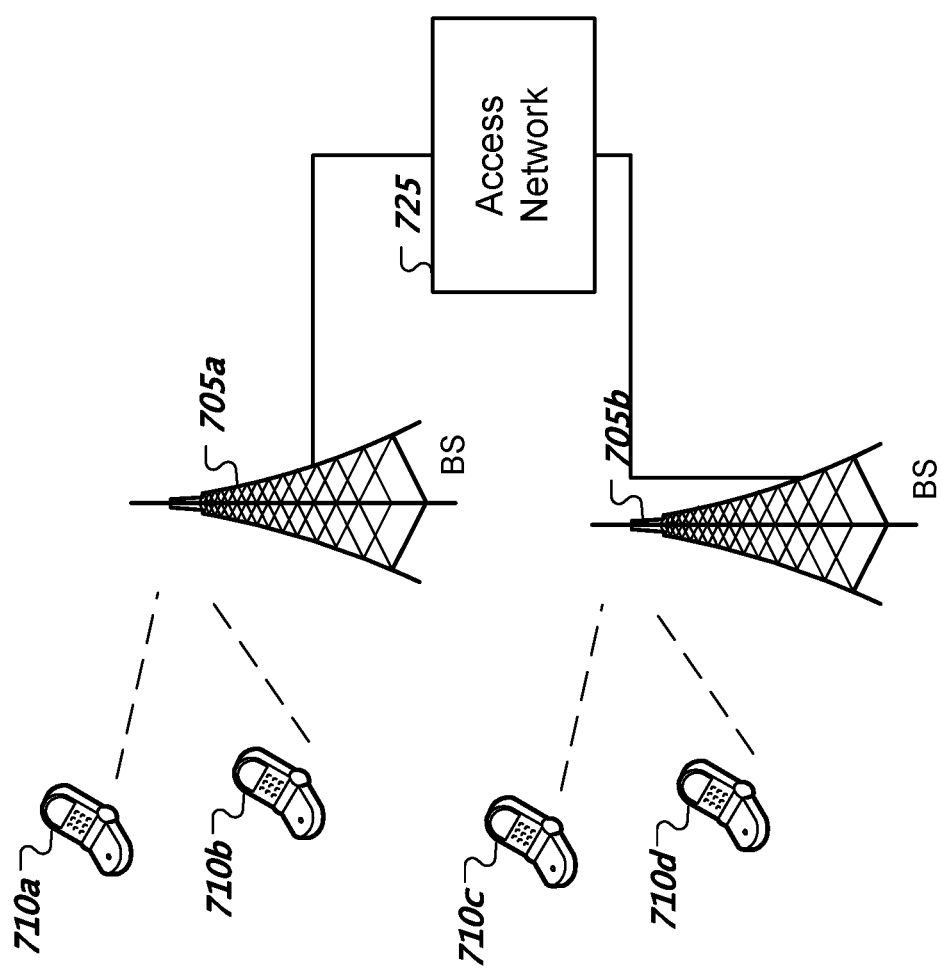
FIG. 7 shows an example of a wireless communication system where techniques in accordance with one or more embodiments of the present technology can be applied.

FIG. 7 shows an example of a wireless communication system where techniques in accordance with one or more embodiments of the present technology can be applied. A wireless communication system 600 can include one or more base stations (BSs) 705a, 705b, one or more wireless devices 710a, 710b, 710c, 710d, and an access network 725. A base station 705a, 705b can provide wireless service to wireless devices 710a, 710b, 710c and 710d in one or more wireless sectors. In some implementations, a base station 705a, 705b includes directional antennas to produce two or more directional beams to provide wireless coverage in different sectors.

The access network 725 can communicate with one or more base stations 705a, 705b. In some implementations, the access network 725 includes one or more base stations 705a, 705b. In some implementations, the access network 725 is in communication with a core network (not shown in FIG. 7) that provides connectivity with other wireless communication systems and wired communication systems. The core network may include one or more service subscription databases to store information related to the subscribed wireless devices 710a, 710b, 710c and 710d. A first base station 705a can provide wireless service based on a first radio access technology, whereas a second base station 705b can provide wireless service based on a second radio access technology. The base stations 705a and 705b may be co-located or may be separately installed in the field according to the deployment scenario. The access network 725 can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 8:
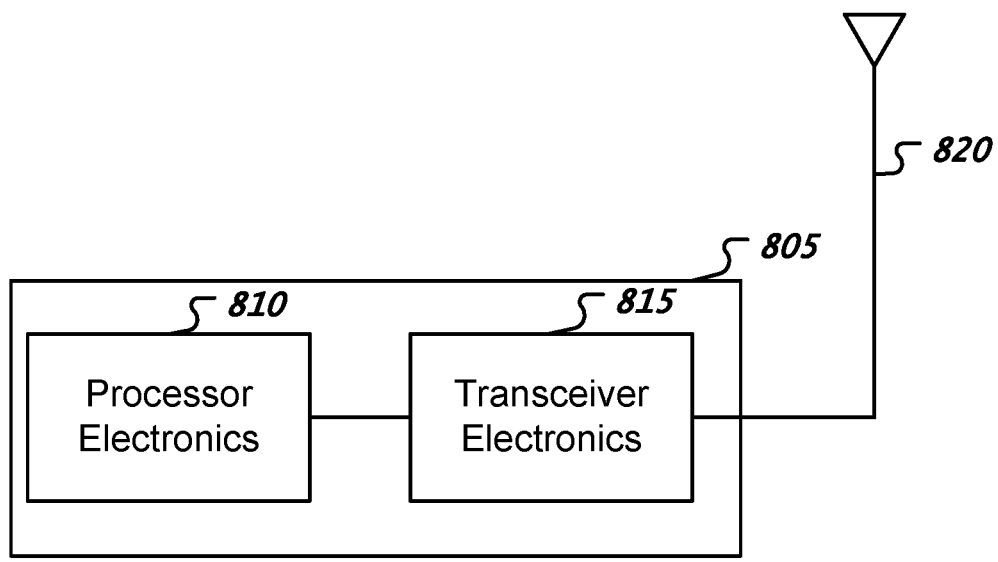
FIG. 8 is a block diagram representation of a portion of a radio station.

FIG. 8 is a block diagram representation of a portion of a radio station. A radio station 805 such as a base station or a wireless device can include processor electronics 810 such as a microprocessor that implements one or more of the wireless techniques presented in this document. The radio station 805 can include transceiver electronics 815 to send and/or receive wireless signals over one or more communication interfaces such as antenna 820. The radio station 805 can include other communication interfaces for transmitting and receiving data. Radio station 805 can include one or more memories configured to store information such as data and/or instructions. In some implementations, the processor electronics 810 can include at least a portion of the transceiver electronics 815. In some embodiments, at least some of the disclosed techniques, modules or functions are implemented using the radio station 805.

Figure 9:
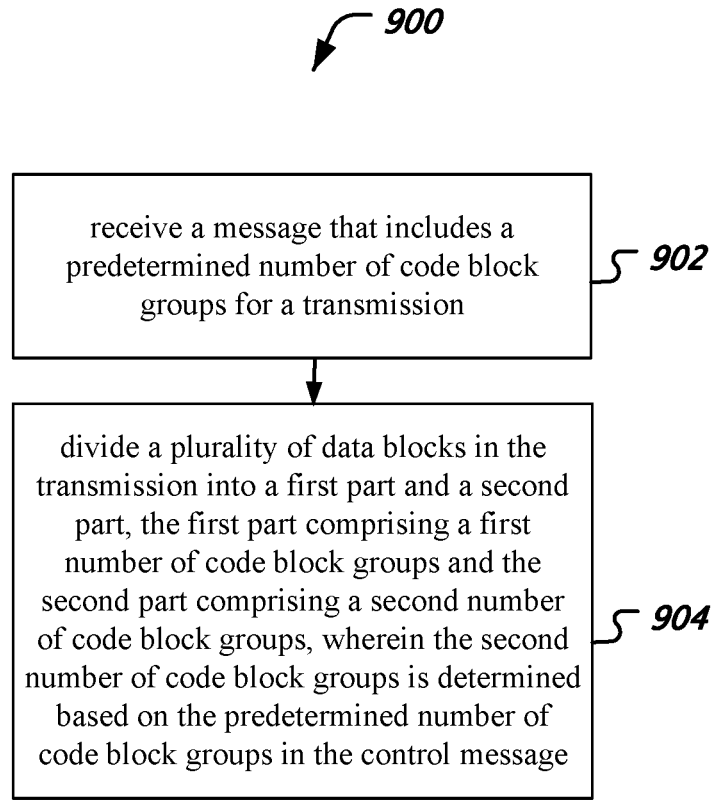
FIG. 9 is a flowchart representation of a method of wireless communication.

FIG. 9 is a flowchart representation of a method of wireless communication. The method 900 may be implemented at a radio station. The method 900 includes, at 902, receiving a message that includes a predetermined number of code block groups for a transmission; and, at 904, dividing a plurality of data blocks in the transmission into a first part and a second part. The first part includes a first number of code block groups and the second part includes a second number of code block groups, and the second number of code block groups is determined based on the predetermined number of code block groups in the control message.

In some embodiments, the predetermined number of code block groups indicates a total number of code block groups in the transmission. The method further includes transmitting an acknowledgement to indicate the transmission of the predetermined number of code block groups. The acknowledgement combines an acknowledgement for the first part and an acknowledgement for the second part. The second part is divided substantially evenly among the second number of code block groups.

In some embodiments, the predetermined number of code block groups is equivalent to the second number of code block groups. The method further includes transmitting one or more acknowledgements to indicate the transmission of a total number of code block groups, wherein the total number of code block groups is determined based on the first number of code block groups and the predetermined number of code block groups.

In some embodiments, the transmission includes an error detecting code for the first part. The first part can include data to be retransmitted due to a failure of transmission in a previous transmission. The first part can also include data preempted in a previous transmission or data for a new transmission. In some implementations, each code block group in the first number of code block groups includes an integer number of symbols within an allocated resource range.

Figure 10:
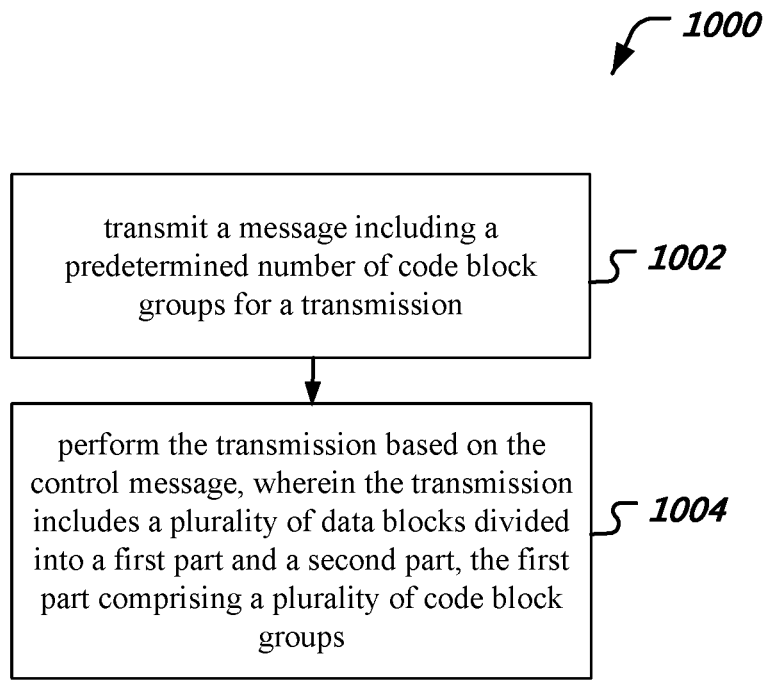
FIG. 10 is a flowchart representation of another method of wireless communication.

FIG. 10 is a flowchart representation of another method of wireless communication. The method 1000 may be implemented at a base station. The method 1000 includes, at 1002, transmitting a message including a predetermined number of code block groups for a transmission; and, at 1004, performing the transmission based on the control message, wherein the transmission includes a plurality of data blocks divided into a first part and a second part, the first part comprising a plurality of code block groups.

In some embodiments, the first part includes data to be retransmitted due to a failure of transmission in a previous transmission. The first part can also include data preempted in a previous transmission. In some implementations, each code block group in the first number of code block groups includes an integer number of symbols within an allocated resource range. The method may also include attaching an error detecting code for the first part to the transmission.

Figure 11:
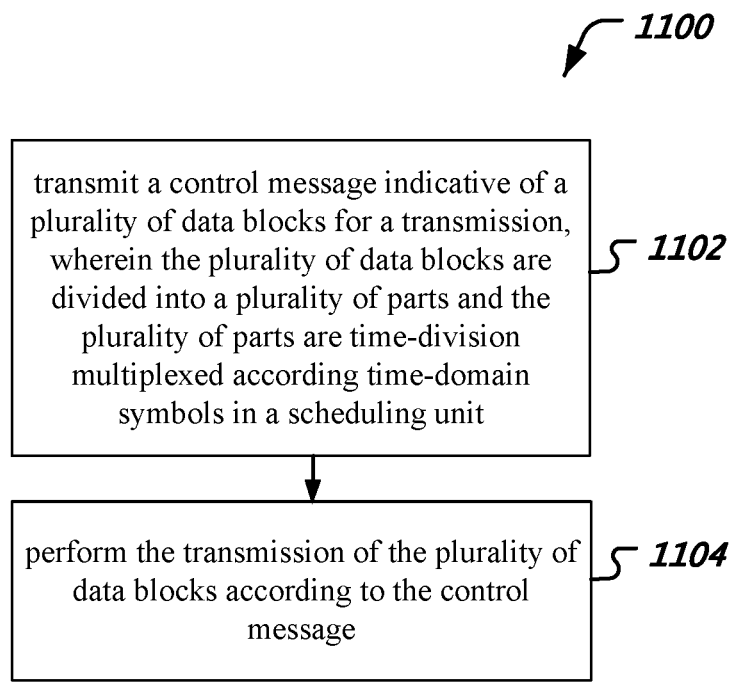
FIG. 11 is a flowchart representation of another method of wireless communication.

FIG. 11 is a flowchart representation of another method of wireless communication. The method 1100 may be implemented at a base station. The method 1100 includes, at 1102, transmitting a control message indicative of a plurality of data blocks for a transmission, wherein the plurality of data blocks are divided into a plurality of parts and the plurality of parts are time-division multiplexed according time-domain symbols in a scheduling unit; and, at 1104, performing the transmission of the plurality of data blocks according to the control message.

In some embodiments, a subset of the plurality of data blocks is for new data that includes a transport block or a code block. The time-domain information of symbols includes a parameter indicative of an initial symbol for at least one of the plurality of data blocks. The time-domain information of symbols can also include, for each of the plurality of data blocks, a parameter indicative of an amount of symbols used by the data block.

In some embodiments, the control message includes information indicative of frequency-domain resources, or demodulation and coding schemes, or one or more process identifiers for the plurality of data blocks, wherein the information is shared by at least a subset of the plurality of data blocks. The control message may include information indicative of frequency-domain resources, or demodulation and coding schemes, or one or more process identifiers for the plurality of data blocks, wherein the information is configured independently for each of the plurality of data blocks. The control message can include an indicator to indicate that a subset of the plurality of data blocks includes data to be retransmitted due to a failure of transmission in a previous transmission. The control message can also include an indicator to indicate that a subset of the plurality of data blocks includes data preempted in a previous transmission. In some implementations, the transmission of the subset of the plurality of data blocks is performed based on one or more mini-slots.

Figure 12:
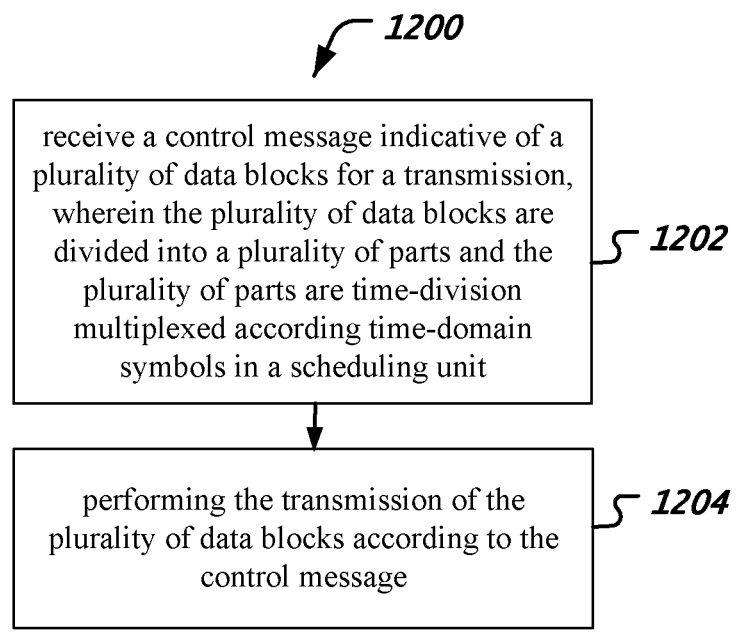
FIG. 12 is a flowchart representation of another method of wireless communication.

FIG. 12 is a flowchart representation of another method of wireless communication. The method 1200 may be implemented at a mobile station. The method 1200 includes, at 1202, receiving a control message indicative of a plurality of data blocks for a transmission, wherein the plurality of data blocks are divided into a plurality of parts and the plurality of parts are time-division multiplexed according time-domain symbols in a scheduling unit; and, at 1204, performing the transmission of the plurality of data blocks according to the control message.

In some embodiments, a subset of the plurality of data blocks is for new data transmission that includes a transport block or a code block. The time-domain information of symbols includes a parameter indicative of an initial symbol for at least one of the plurality of data blocks. The time-domain information of symbols can also include, for each of the plurality of data blocks, a parameter indicative of an amount of symbols used by the data block.

In some embodiments, the control message includes information indicative of frequency-domain resources, or demodulation and coding schemes, or one or more process identifiers for the plurality of data blocks, wherein the information is shared by at least a subset of the plurality of data blocks. The control message may include information indicative of frequency-domain resources, or demodulation and coding schemes, or one or more process identifiers for the plurality of data blocks, wherein the information is shared by at least a subset of the plurality of data blocks. The control message can include an indicator to indicate that a subset of the plurality of data blocks includes data to be retransmitted due to a failure of transmission in a previous transmission. The control message can also include an indicator to indicate that a subset of the plurality of data blocks includes data preempted in a previous transmission. In some implementations, the transmission of the subset of the plurality of data blocks is performed based on one or more mini-slots.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for wireless communication, comprising:
transmitting a control message indicative of a plurality of data blocks in a scheduling unit for a transmission,
wherein the control message includes (1) a start position of a first transport block of the plurality of data blocks and an end position or a length of each data block of the plurality of data blocks, or (2) a start position and an end position of each data block of the plurality of data blocks,
wherein Orthogonal Frequency Division Multiplexing (OFDM) symbols of the plurality of data blocks are adjacent to each other,
wherein the plurality of data blocks is time-division multiplexed according to the OFDM symbols,
wherein the control message further includes: frequency-domain resource information, modulation and coding information and process number information,
wherein the frequency-domain resource information are independent for each of multiple data blocks of the plurality of data blocks, and wherein the modulation and coding information is shared by the multiple data blocks of the plurality of data blocks; and
performing the transmission of the plurality of data blocks according to the control message.

2. The method of claim 1, wherein a subset of the plurality of data blocks is for new data and remaining of the plurality of data blocks is for retransmitted data, wherein the new data or the retransmitted data includes a transport block or a code block.

3. The method of claim 1, wherein the control message includes an indicator to indicate that a subset of the plurality of data blocks includes data preempted in a previous transmission.

4. The method of claim 1, wherein the transmission of the subset of the plurality of data blocks is performed based on one or more mini-slots.

5. A wireless communication method, comprising:
receiving a control message indicative of a plurality of data blocks in a scheduling unit for a transmission,
wherein the control message includes (1) a start position of a first transport block of the plurality of data blocks and an end position or a length of each data block of the plurality of data blocks, or (2) a start position and an end position of each data block of the plurality of data blocks, and wherein Orthogonal Frequency Division Multiplexing (OFDM) symbols of the plurality of data blocks are adjacent to each other, wherein the plurality of data blocks is time-division multiplexed according the OFDM symbols,
wherein the control message further includes: frequency-domain resource information, modulation and coding information and process number information,
wherein the frequency-domain resource information are independent for each of multiple data blocks of the plurality of data blocks, and wherein the modulation and coding information is shared by the multiple data blocks of the plurality of data blocks; and
performing the transmission of the plurality of data blocks according to the control message.

6. The method of claim 5, wherein a subset of the plurality of data blocks is for new data and remaining of the plurality of data blocks is for retransmitted data, wherein the new data or the retransmitted data includes a transport block or a code block.

7. The method of claim 5, wherein the control message includes an indicator to indicate that a subset of the plurality of data blocks includes data preempted in a previous transmission.

8. The method of claim 7, wherein the transmission of the subset of the plurality of data blocks is performed based on one or more mini-slots.

9. A device for wireless communication, comprising:
a memory to store code, and
a processor that is in communication with the memory and operable to execute the code to cause the wireless communication device to:
transmit a control message indicative of a plurality of data blocks in a scheduling unit for a transmission, wherein the control message includes (1) a start position of a first transport block of the plurality of data blocks and an end position or a length of each data block of the plurality of data blocks, or (2) a start position and an end position of each data block of the plurality of data blocks, and wherein Orthogonal Frequency Division Multiplexing (OFDM) symbols of the plurality of data blocks are adjacent to each other, wherein the plurality of data blocks is time-division multiplexed according to the OFDM symbols,
wherein the control message further includes: frequency-domain resource information, modulation and coding information and process number information,
wherein the frequency-domain resource information are independent for each of multiple data blocks of the plurality of data blocks, and wherein the modulation and coding information is shared by the multiple data blocks of the plurality of data blocks; and
perform the transmission of the plurality of data blocks according to the control message.

10. The device of claim 9, wherein the control message includes an indicator to indicate that a subset of the plurality of data blocks includes data preempted in a previous transmission.

11. The device of claim 10, wherein the transmission of the subset of the plurality of data blocks is performed based on one or more mini-slots.

12. The device of claim 9, wherein a subset of the plurality of data blocks is for new data and remaining of the plurality of data blocks is for retransmitted data, wherein the new data or the retransmitted data includes a transport block or a code block.

13. A device for wireless communication, comprising:
a memory to store code, and
a processor that is in communication with the memory and operable to execute the code to cause the wireless communication device to:
receive a control message indicative of a plurality of data blocks in a scheduling unit for a transmission,
wherein the control message includes (1) a start position of a first transport block of the plurality of data blocks and an end position or a length of each data block of the plurality of data blocks, or (2) a start position and an end position of each data block of the plurality of data blocks, and wherein Orthogonal Frequency Division Multiplexing (OFDM) symbols of the plurality of data blocks are adjacent to each other, wherein the plurality of data blocks is time-division multiplexed according the OFDM symbols, wherein the control message further includes: frequency-domain resource information, modulation and coding information and process number information, wherein the frequency-domain resource information are independent for each of multiple data blocks of the plurality of data blocks, and wherein the modulation and coding information is shared by the multiple data blocks of the plurality of data blocks; and perform the transmission of the plurality of data blocks according to the control message.

14. The device of claim 13, wherein the control message includes an indicator to indicate that a subset of the plurality of data blocks includes data preempted in a previous transmission.

15. The device of claim 14, wherein the transmission of the subset of the plurality of data blocks is performed based on one or more mini-slots.

16. The device of claim 13, wherein a subset of the plurality of data blocks is for new data and remaining of the plurality of data blocks is for retransmitted data, wherein the new data or the retransmitted data includes a transport block or a code block.

* * * * *

UNITED STATES PATENT AND TRADEMARK OFFICE
CERTIFICATE OF CORRECTION

PATENT NO. : 11,271,693 B2
APPLICATION NO. : 16/673956
DATED : March 8, 2022
INVENTOR(S) : Gou et al.

It is certified that error appears in the above-identified patent and that said Letters Patent is hereby corrected as shown below:

On the Title Page

On Page 2, in Item (56), under "OTHER PUBLICATIONS", in Column 2, Line 45, delete "Zte" and insert -- ZTE --, therefor.

On Page 3, in Item (56), under "OTHER PUBLICATIONS", in Column 1, Line 9, delete "Zte," and insert -- ZTE, --, therefor.

In the Specification

In Column 2, Lines 1-2, delete "according time-domain" and insert -- according to time-domain --, therefor at each occurrence throughout the Patent.

In Column 4, Line 14, delete "Broad Band" and insert -- Broadband --, therefor.

In Column 4, Line 27, delete "of" and insert -- for --, therefor.

In Column 5, Line 12, delete "code data blocks" and insert -- code block groups --, therefor.

In Column 11, Lines 28-29, delete "CB#1 (401), CB #2 (403), and CB #3 (405)." and insert -- CB#1 (401), CB#2 (403), and CB#3 (405). --, therefor.

In Column 11, Line 35, delete "aligned" and insert -- align --, therefor.

Signed and Sealed this
Seventeenth Day of May, 2022

Katherine Kelly Vidal
*Director of the United States Patent and Trademark Office*